US010100228B2

(12) United States Patent
Vemulapati et al.

(10) Patent No.: US 10,100,228 B2
(45) Date of Patent: Oct. 16, 2018

(54) MULTI-PURPOSE, DUAL SIDE TAPE WITH PULL-DOWN PEEL TAB

(71) Applicants: FORD GLOBAL TECHNOLOGIES, LLC, Dearborn, MI (US); Satyanarayana Raju Vemulapati, Westland, MI (US); Srivardhan Tallapragada, Tallahassee, FL (US); Sandip Patel, Canton, MI (US)

(72) Inventors: Satyanarayana Raju Vemulapati, Westland, MI (US); Srivardhan Tallapragada, Tallahassee, FL (US); Sandip Patel, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 14/443,297

(22) PCT Filed: May 16, 2014

(86) PCT No.: PCT/US2014/038418
§ 371 (c)(1),
(2) Date: May 15, 2015

(87) PCT Pub. No.: WO2015/174999
PCT Pub. Date: Nov. 19, 2015

(65) Prior Publication Data
US 2017/0058150 A1 Mar. 2, 2017

(51) Int. Cl.
*B29C 65/50* (2006.01)
*C09J 7/02* (2006.01)
(Continued)

(52) U.S. Cl.
CPC ......... *C09J 7/0232* (2013.01); *B29C 65/5042* (2013.01); *B29C 66/43* (2013.01);
(Continued)

(58) Field of Classification Search
CPC ..... B29C 65/00; B29C 66/43; B29C 65/5042; C09J 7/02; C09J 7/0232; C09J 7/403;
(Continued)

(56) References Cited

U.S. PATENT DOCUMENTS 3,977,025 A * 8/1976 Horan ................ A41D 13/1209
2/114
4,207,895 A * 6/1980 Schaar .................... A61F 13/58
604/390
(Continued)

FOREIGN PATENT DOCUMENTS

DE 102007007499 * 8/2008

OTHER PUBLICATIONS

DE102007007499 Machine Translation.*

*Primary Examiner* — Michael N Orlando
*Assistant Examiner* — Cynthia L Schaller
(74) *Attorney, Agent, or Firm* — LeClairRyan

(57) ABSTRACT

An attachment system for attaching a first component and a second component includes a dual sided tape assembly having a dual sided tape, a release liner having a pull-down peel tab and a base release liner releasably attached to the dual sided tape, and a retainer for holding the pull-down peel tab to the base. The retainer may be either a sleeve or an adhesive pad. If the retainer is a sleeve, the release liner includes an intermediate portion between the pull-down peel tab and the base. Folded areas exist between the pull-down peel tab, the intermediate area, and the base. A portion of the intermediate portion passes through the sleeve. If retainer is an adhesive pad, the adhesive pad is attached to the base. The pull-down peel tab is temporarily attached to the adhesive pad when initially installed on a substrate.

9 Claims, 5 Drawing Sheets

(51) Int. Cl.
*B29C 65/00* (2006.01)
*C09J 5/00* (2006.01)
*C09J 7/40* (2018.01)
*B29L 31/30* (2006.01)

(52) U.S. Cl.
CPC . C09J 5/00 (2013.01); C09J 7/40 (2018.01); C09J 7/403 (2018.01); *B29L 2031/30* (2013.01)

(58) Field of Classification Search
CPC .... C09J 7/40; C09J 5/00; A41D 13/12; A41D 27/12; B29L 2031/30
See application file for complete search history.

(56) References Cited

U.S. PATENT DOCUMENTS

| | | | | |
|---|---|---|---|---|
| 4,605,577 A | * | 8/1986 | Bowytz | C09J 7/02 156/313 |
| 5,498,455 A | * | 3/1996 | Roberts | A47G 1/175 40/773 |
| 6,138,278 A | * | 10/2000 | Taylor | A41D 13/1227 2/114 |
| 2011/0083244 A1 | * | 4/2011 | Gellerstedt | A41D 13/1209 2/59 |

* cited by examiner

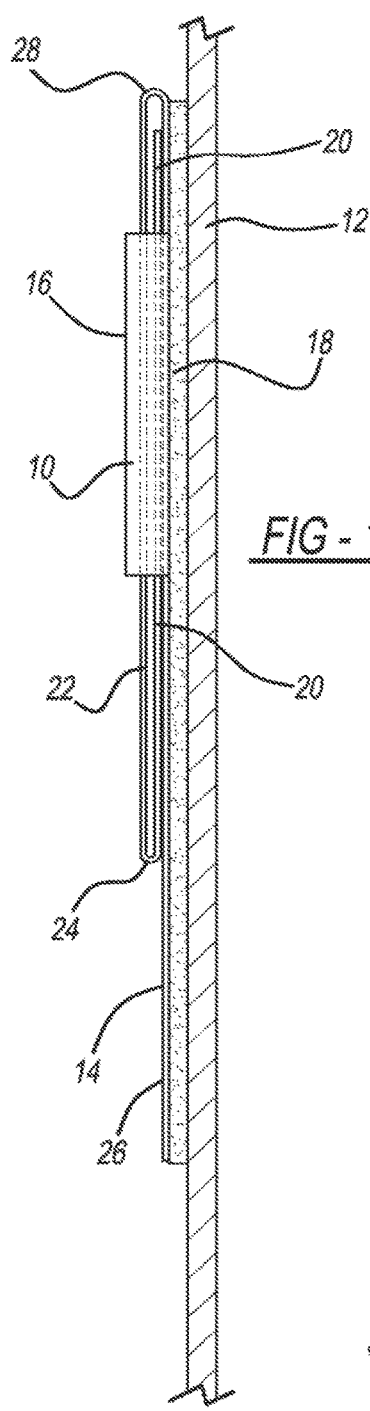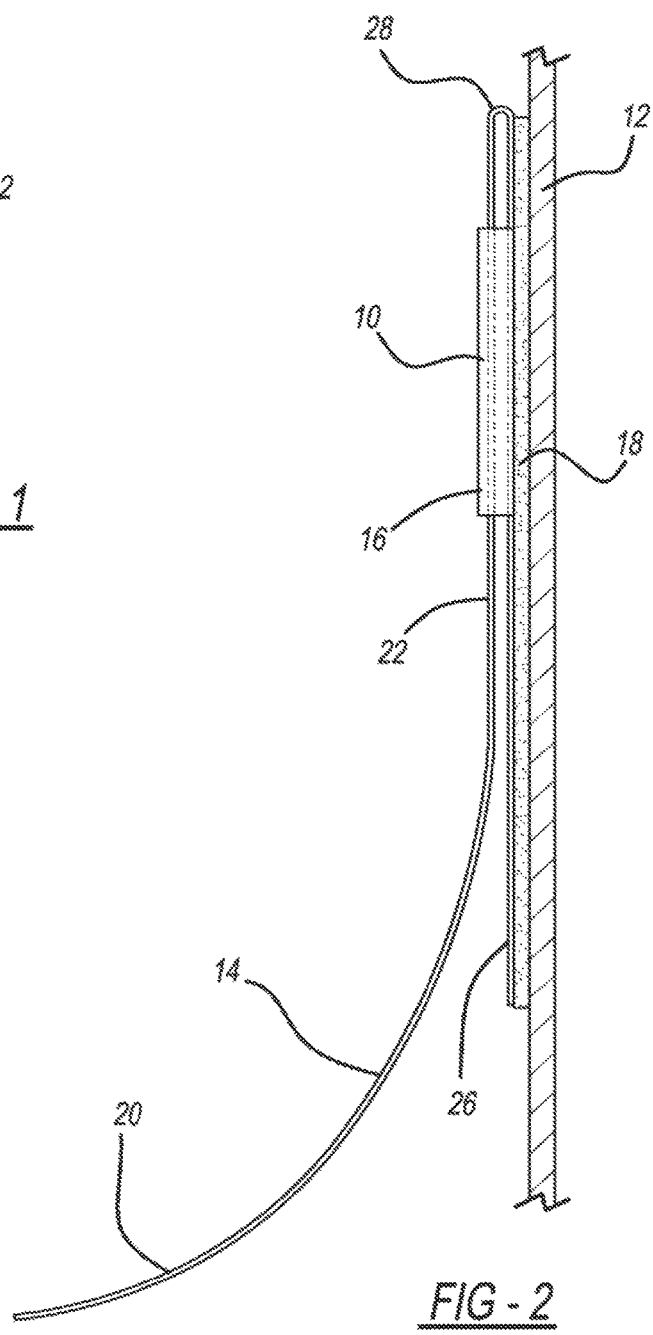

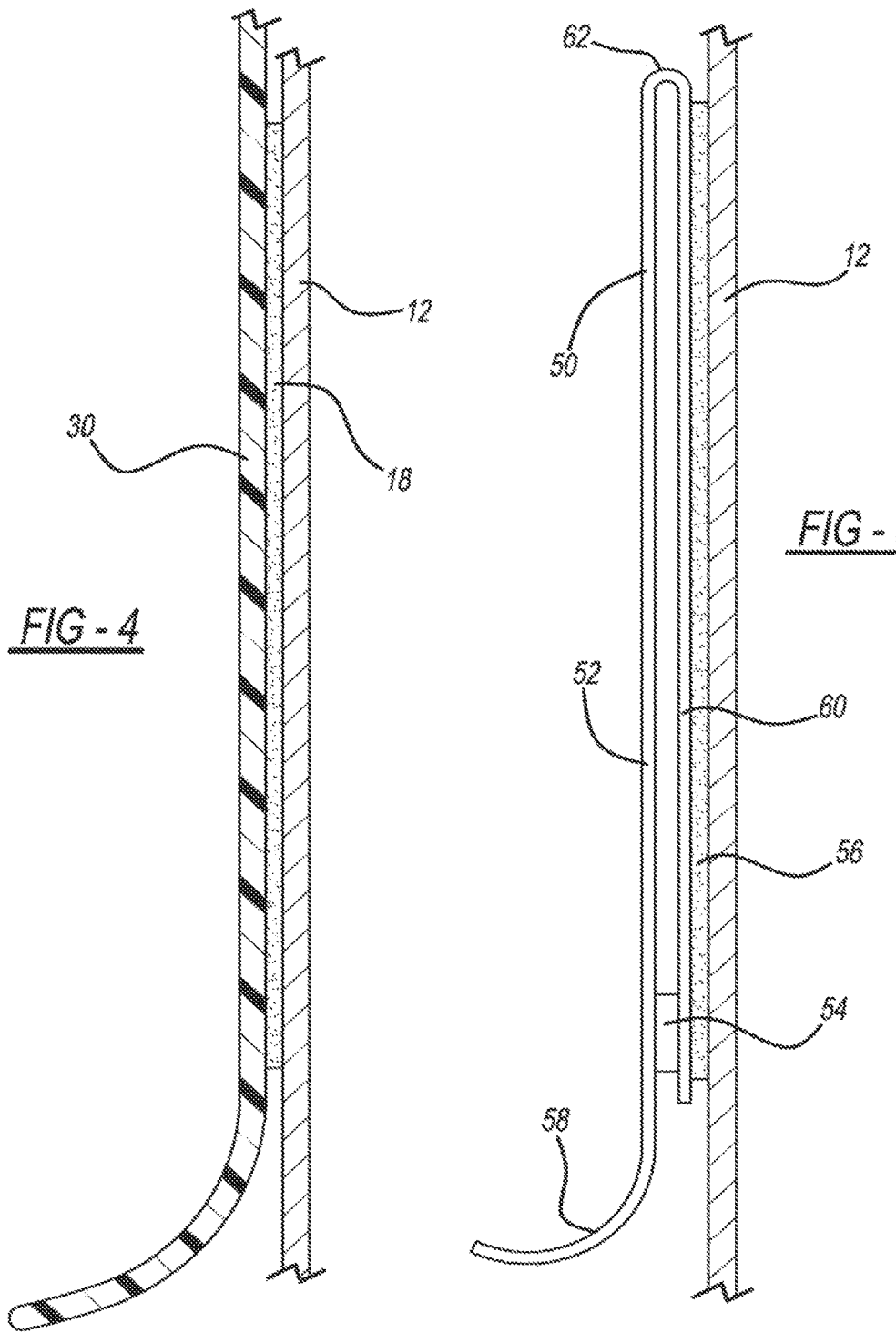

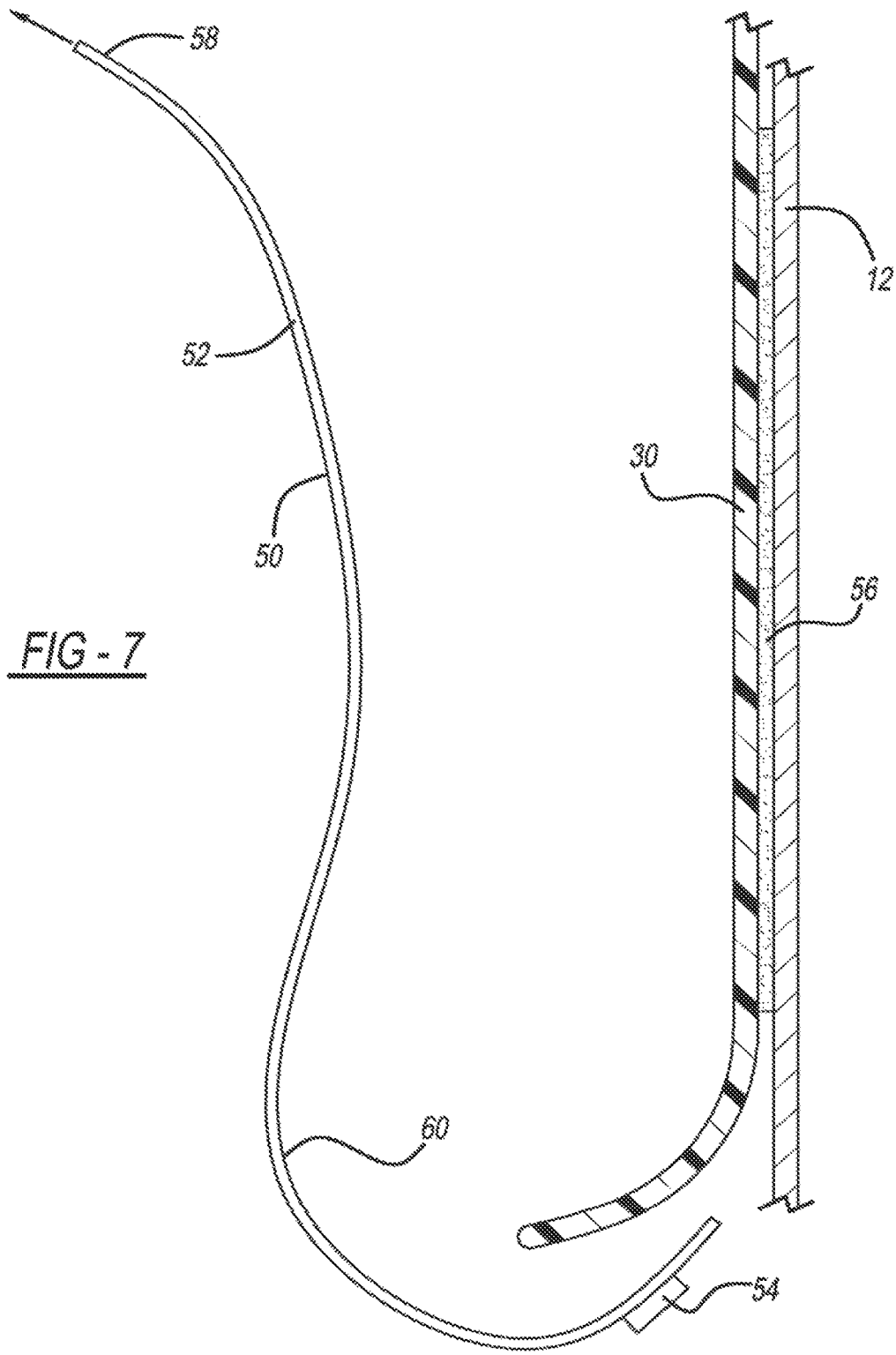

MULTI-PURPOSE, DUAL SIDE TAPE WITH PULL-DOWN PEEL TAB

TECHNICAL FIELD

The disclosed inventive concept relates generally to methods and systems for attaching a first component to a second component using dual sided tape for use in any circumstance where two components are attached together, including both automotive and non-automotive applications. More particularly, the disclosed inventive concept is directed to an attachment system utilizing dual sided tape having an installer-manipulated pull-down peel tab for first aligning a first component to a second component and then attaching the components. The components may be of any type and of any material. The system of the disclosed inventive concept has application in, for example, the automotive industry for attachment of first component, such as an exterior or interior automotive trim piece of a vehicle, to a second component, such as the outside or inside of a metal door of a vehicle, the release liner being removable after the first component has been aligned into position relative to the second component.

BACKGROUND OF THE INVENTION

The attachment of a first component to a second component is accomplished today by a variety of ways. In the automotive industry, for example, conventional methods of attachment include the welding of two metal components and the use of mechanical fasteners, such as nuts and bolts and rivets. Newer techniques include the use of advanced adhesives in attaching, for example, aluminum components to one another. These techniques are generally satisfactory for the attachment of components made up of the same or similar materials. They may be used alone or in combination, as is known.

Also in the automotive industry, greater challenges arise in the assembly of components made of different materials, such as the attachment of first component (such as an exterior or interior automotive trim piece of a vehicle) to a second component, perhaps made of a metal (such as the outside or inside of a metal door of a vehicle). Today a wide variety of trim pieces are attached to a metal substrate both on the outside and the inside of the modern vehicle. Such exterior trim pieces might include, but are not limited to, light bezels, bumper fascia and door molding, while interior trim pieces might include, but again are not limited to, door panels, pillar trim, and instrument panel components.

Conventional approaches to the attachment of interior and exterior trim pieces to the metal substrate include the use of mechanical fasteners, such as push-type nylon fasteners and bent-wire trim clips. While proving largely effective in retaining the trim piece to the metal substrate, the use of mechanical fasteners in such applications introduces added complexity into the assembly process. The fasteners must be first produced and provided to the assembler. The assembly then must attach the fastener to the trim piece, which must then be properly aligned with the fastener-receiving holes formed in the metal substrate.

As an alternative to the use of mechanical fasteners in the attachment of interior and exterior trim pieces to the metal substrate in automotive applications, some manufacturers are using prepared adhesives, such as dual sided tape that includes release liner attached to both surfaces of the tape. Typically the release liner is removed from one side of the tape which is then attached to the metal substrate. Once the tape is in position on the metal surface, the release liner on the opposite surface is removed and the trim piece is attached to the exposed side of the dual sided tape.

While being more cost-efficient and assembly time-saving than mechanical fasteners, the use of dual sided tape in the assembly process too frequently results in the misalignment of the trim piece relative to the metal substrate. The adhesive surfaces of the dual sided tape are purposefully very strong, thus requiring removal of the tape from both the trim piece and the metal substrate in the event that misalignment occurs on initial assembly. This problem offsets the assembly cost-savings experienced through the use of dual sided tape when compared with the use of mechanical fasteners.

As in so many areas of vehicle technology there is always room for improvement related to vehicle assembly systems.

SUMMARY OF THE INVENTION

The disclosed inventive concept overcomes the problems associated with known systems for attaching one component to another using dual sided adhesive tape. Particularly, the attachment system of the disclosed inventive concept provides a dual sided tape assembly having a dual sided tape, a release liner having a pull-down peel tab and a base release liner releasably attached to the dual sided tape, and a retainer for holding the pull-down peel tab to the base. The retainer may be either a sleeve according to one embodiment of the disclosed inventive concept or an adhesive pad according to another embodiment of the disclosed inventive concept.

According to the embodiment of the disclosed inventive in which a sleeve is used, the release liner includes an intermediate portion between the pull-down peel tab and the base, a folded area connecting the intermediate portion and the base, and a folded area connecting the pull-down peel tab and the intermediate portion. At least a portion of the intermediate portion passes through the sleeve.

According to the embodiment of the disclosed inventive in which an adhesive pad is used, the adhesive pad is attached to the base. The pull-down peel tab is temporarily attached to the adhesive pad when initially installed on a substrate. The pull-down peel tab extends between and beyond the two components, making it readily accessible to the installer.

In use, a release tape is removed from one side of the dual sided tape portion of the tape assembly for attachment to the piece being attached, although the tape assembly may be initially attached to the substrate as an alternative. If the embodiment of the disclosed inventive concept having the sleeve is used, the installer can pull on the tab and remove the entire dual sided tape assembly, including the release liner and the sleeve, thus exposing the adhesive formed on the opposite side of the dual sided tape so that attachment of the component to the substrate can be accomplished.

If the embodiment of the disclosed inventive concept having the adhesive pad is used, the pull-down peel tab already extends between the component being attached and the substrate such that the installer can pull on the tab and remove the entire dual sided tape assembly, including the release liner and the adhesive pad. This method also exposes the adhesive formed on the opposite side of the dual sided tape so that attachment of the component (such as interior and exterior trim pieces) to the substrate can be accomplished.

Regardless of the embodiment, the disclosed inventive concept finds use in any area where one component is to be attached to another and where proper alignment of the component being attached relative to the other component prior to attachment is desired. Such uses may include, for example, household applications such as the hanging of a picture or other object on a wall. The system of the disclosed inventive concept may also find application in a number of industrial settings that include, for example, the automotive, airline and rail industries. Thus use of the dual sided tape assembly is not limited to any particular industry.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 1 illustrates sectional view of a dual sided tape assembly attached to a first component following initial attachment according to a first embodiment of the disclosed inventive concept;

FIG. 2 illustrates a view similar to that of FIG. 1 but showing peel-down peel tab portion of the release liner withdrawn from the sleeve;

FIG. 4 illustrates a view similar to that of FIG. 3 but with the release tape having been removed to thereby expose the molding-facing side of the dual sided tape;

FIG. 5 illustrates sectional view of a dual sided tape assembly attached to a first component following initial attachment and having the looped pull-down peel tab temporarily attached to a portion of the release liner according to a second embodiment of the disclosed inventive concept;

FIG. 7 illustrates a view similar to that of FIG. 6 but with the release tape having been removed to thereby expose the molding-facing side of the dual sided tape.

DETAILED DESCRIPTION OF THE PREFERRED EMBODIMENT

Figure 3:
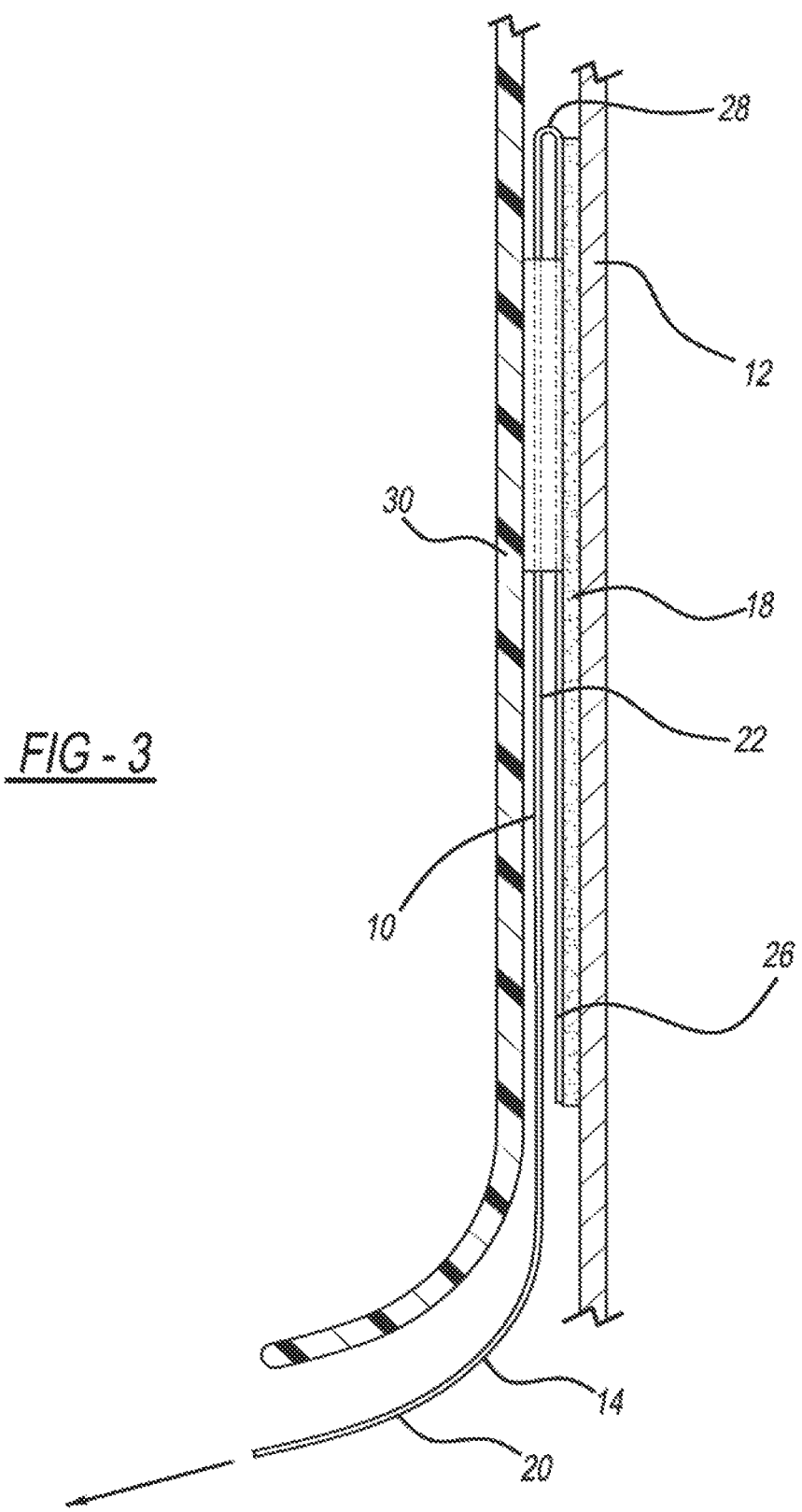
FIG. 3 illustrates a view similar to that of FIG. 2 but with the second component being moved into position relative to the first component.

In the following figures, the same reference numerals will be used to refer to the same components. In the following description, various operating parameters and components are described for different constructed embodiments. These specific parameters and components are included as examples and are not meant to be limiting.

The disclosed inventive concept may find application in any number of assembly applications, including the automotive industry where attachment of trim pieces to metal substrates is required in the assembly of vehicles. However, and as noted above, the disclosed inventive concept may also find use in any application where a first part must be properly aligned prior to attachment to a second part and in which the use of dual sided tape proves an effective form of attachment.

The disclosed inventive concept is illustrated in two embodiments. The first embodiment is set forth in FIGS. 1 through 4 and is discussed in relation thereto. The second embodiment is set forth in FIGS. 5 through 7 and is discussed in relation thereto.

Referring to the first embodiment of the disclosed inventive concept, a dual sided tape assembly 10 is shown attached to a trim piece 12 in FIGS. 1 through 4. The trim piece 12 may be made of any material, such as a plastic, and may be any type of piece, such as an exterior or interior automotive trim piece for a vehicle, attachable to a substrate. However, it is to be understood that "trim piece" is to be broadly defined as any component attachable to any substrate.

As illustrated in FIGS. 1 through 3, the dual sided tape assembly 10 includes a release liner 14, a sleeve 16, and a dual sided tape portion 18. The sleeve 16 is attached to the release liner 14. A second release liner (not shown) is attached to the dual sided tape portion 18 and is in place for shipment and prior to attachment to keep the dual sided tape portion 18 from adhering to anything prematurely.

The release liner 14 includes a pull-down peel tab portion 20. The release liner 14 further includes an intermediate portion 22 that is connected to the pull-down peel tab portion 20 at a first loop 24. The intermediate portion 22 is also retained within the sleeve 16 at this stage of attachment. The release liner 14 finally includes a base portion 26 that is in place on the dual sided tape portion 18 until the release liner 14 is fully removed as will be discussed below. The base portion 26 is connected to the intermediate portion 22 at a second loop 28 that is defined by a weld spot or a fold. As illustrated in FIG. 2, the peel-down peel tab portion 20 of the release liner 14 is shown withdrawn from the sleeve 16.

As illustrated in FIG. 3, the trim piece 12 is shown moved into its position relative to a substrate 30 for proper alignment therewith. The substrate 30 may be of any material but in the automotive industry would typically be composed of metal and would typically be found in the interior or exterior of an automotive vehicle (not shown). Regardless of the type of piece, by being able to align the trim piece 12 precisely on the substrate 30 prior to removal of the release liner 14 and thus prior to fixation to the dual sided tape portion 18, the installer can achieve the most accurate position possible.

As illustrated, the pull-down peel tab portion 20 extends from between the substrate 30 and the trim piece 12. Once the trim piece 12 is in its precise position, the installer pulls on the pull-down peel tab portion 20 to remove the release liner 14 and the attached sleeve 16. Thus removed, the trim piece-facing adhesive surface of the dual sided tape portion 18 is exposed, allowing the trim piece 12 to be attached to the substrate 30 as illustrated in FIG. 4.

The embodiment of the system and method of attaching a first component to a second component illustrated in FIGS. 1 through 4 and discussed in relation thereto provides one approach. An alternative system and method of making such an attachment is set forth in FIGS. 5 through 7 and is discussed in relation thereto.

Figure 6:
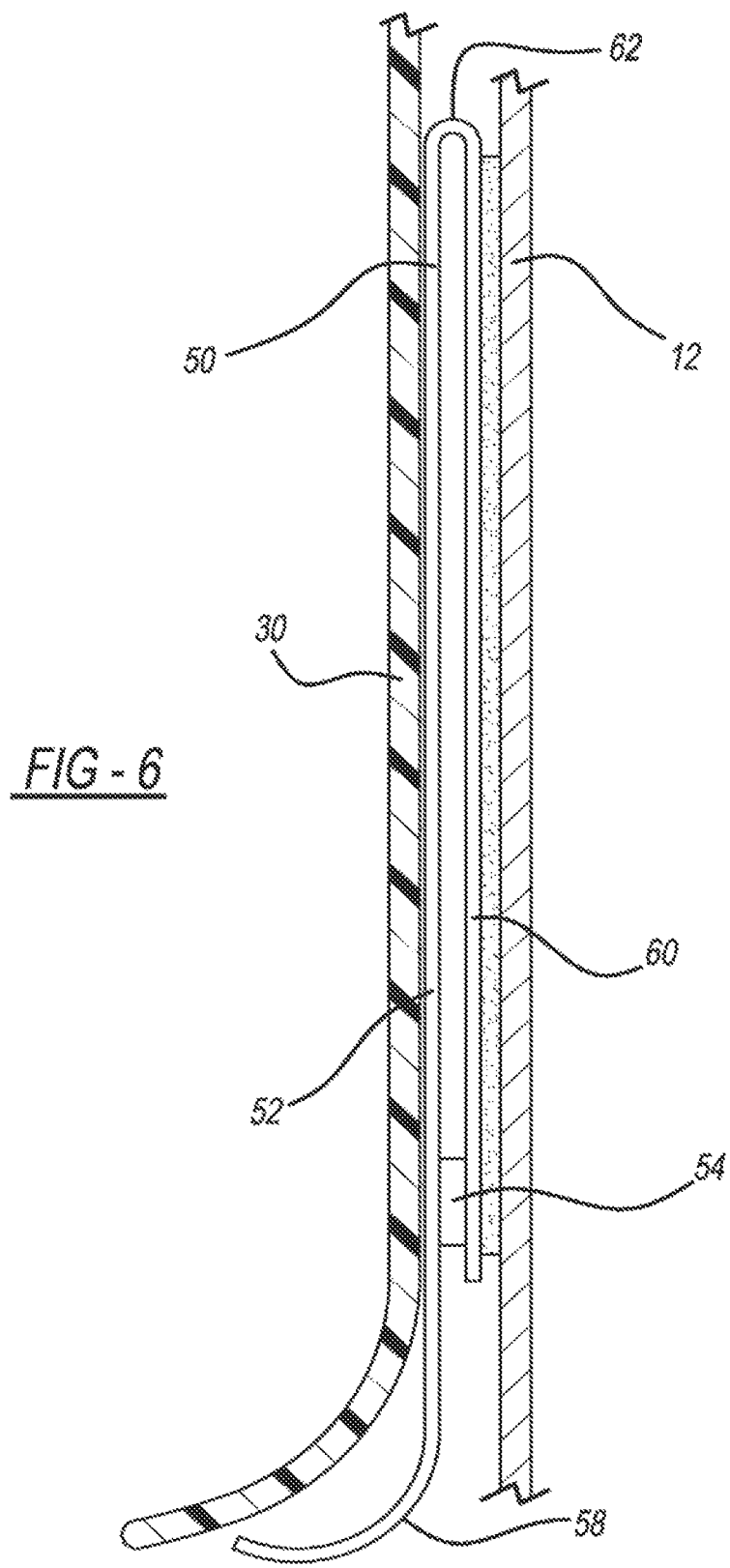
FIG. 6 illustrates a view similar to that of FIG. 5 but with a the first component being moved into position relative to the second component.

Referring to the second embodiment of the disclosed inventive concept as illustrated in FIGS. 5 through 7, a dual sided tape assembly 50 is shown attached to the trim piece 12. The dual sided tape assembly 50 includes a release liner 52, an adhesive pad 54, and a dual sided tape portion 56. The adhesive pad 54 is attached to the release liner 52. A second release liner (not shown) is attached to the dual sided tape portion 56 and is in place for shipment and prior to attachment to keep the dual sided tape portion 56 from adhering to anything prematurely. As illustrated in FIGS. 5 through 7, the second release layer has been removed and the dual sided tape assembly 50 has been attached to the trim piece 12.

The release liner 52 includes a pull-down peel tab portion 58 and a base portion 60. The pull-down peel tab portion 58 is connected to the base portion 60 at a loop or crease 62.

The adhesive pad 54 is fixed to the base portion 60 of the release liner 52. The pull-down peel tab portion 58 of the release liner 52 is temporarily attached to the adhesive pad 54 for shipment and during the time the dual sided tape assembly 50 is first applied to the trim piece 12 as illustrated in FIG. 5. The base portion 60 is in place on the dual sided tape portion 56 until the release liner 52 is fully removed as will be discussed below.

FIG. 5 illustrates the initial step of the disclosed method of attaching a trim piece to a substrate where the dual sided tape assembly 50 has been attached first to the trim piece after the second release layer has been removed. In FIG. 6, the trim piece 12 is shown moved into position on the substrate 30. As with the first embodiment of the disclosed inventive concept shown in FIGS. 1 through 4 and discussed in relation thereto, by being able to align the trim piece 12 precisely on the substrate 30 prior to removal of the release liner 52 and thus prior to fixation to the dual sided tape portion 56, the installer can also achieve the most accurate position possible.

As shown in FIG. 6, the pull-down peel tab portion 58 is accessible to the installer, extending from between the trim piece 12 and the substrate 30. Once the trim piece 12 is in its precise position in proper alignment relative to the substrate 30, the installer pulls on the pull-down peel tab portion 58 to remove the release liner 52 and the attached adhesive pad 54. Once the release liner 52 and the adhesive pad 54 have been removed, the trim piece-facing adhesive surface of the dual sided tape portion 56 is exposed, allowing the trim piece 12 to be precisely attached to the substrate 30 as illustrated in FIG. 7.

For at least the above reasons the disclosed invention as set forth above overcomes the challenges faced by known systems for attaching a first component to a second component. However, one skilled in the art will readily recognize from such discussion, and from the accompanying drawings and claims that various changes, modifications and variations can be made therein without departing from the true spirit and fair scope of the invention as defined by the following claims.

What is claimed is:

1. An attachment system for attaching one component to another component, the system comprising:
    a dual sided tape having adhesive sides;
    a release liner having a pull-down peel tab and a base connected to said tab by a fold, said base being releasably attached to said tape; and
    a sleeve for holding said tab to said base, said sleeve being attached to said base, a portion of said release liner extending through said sleeve.

2. The attachment system of claim 1 wherein said release liner includes an intermediate portion between said pull-down peel tab and said base and a folded area connecting said intermediate portion and said base.

3. The attachment system of claim 2 further including a folded area connecting said pull-down peel tab and said intermediate portion.

4. The attachment system of claim 3 wherein part of said intermediate portion passes though said sleeve.

5. An attachment system for attaching one component to another component, the system comprising:
    a dual sided tape having adhesive sides;
    a release liner having a pull-down peel tab and a base connected to said tab by a fold, said base being releasably attached to said tape; and
    a sleeve for holding said tab to said base, said sleeve being attached to said base, a portion of said release liner extending through said sleeve,
    said release liner including an intermediate portion between said pull-down peel tab and said base and a folded area connecting said intermediate portion and said base.

6. The attachment system of claim 5 further including a folded area connecting said pull-down peel tab and said intermediate portion.

7. The attachment system of claim 6 wherein part of said intermediate portion passes though said sleeve.

8. An attachment system for attaching one component to another component, the system comprising:
    a dual sided tape having adhesive sides;
    a release liner having a pull-down peel tab and a base connected to said tab by a fold, said base being releasably attached to said tape; and
    a sleeve for holding said tab to said base, said sleeve being attached to said base, a portion of said release liner extending through said sleeve,
    said release liner including an intermediate portion between said pull-down peel tab and said base and a folded area connecting said intermediate portion and said base, part of said intermediate portion passing though said sleeve.

9. The attachment system of claim 8 further including a folded area connecting said pull-down peel tab and said intermediate portion.

* * * * *